US011046287B1

(12) United States Patent
Schafer et al.

(10) Patent No.: US 11,046,287 B1
(45) Date of Patent: Jun. 29, 2021

(54) SYSTEM AND METHOD FOR VEHICLE THEFT PREVENTION

(71) Applicant: InterMotive, Inc., Auburn, CA (US)

(72) Inventors: Gregory E. Schafer, Incline Village, NV (US); Dan C. Mower, Grass Valley, CA (US); Erin M. West, Auburn, CA (US); Ryan B. Ebuen, Rocklin, CA (US)

(73) Assignee: InterMotive, Inc., Auburn, CA (US)

( * ) Notice: Subject to any disclaimer, the term of this patent is extended or adjusted under 35 U.S.C. 154(b) by 0 days.

(21) Appl. No.: 16/104,636

(22) Filed: Aug. 17, 2018

Related U.S. Application Data

(60) Provisional application No. 62/547,575, filed on Aug. 18, 2017.

(51) Int. Cl.
| | |
|---|---|
| B60R 25/10 | (2013.01) |
| B60R 25/24 | (2013.01) |
| F16H 61/22 | (2006.01) |
| B60R 25/00 | (2013.01) |
| B60R 25/104 | (2013.01) |
| B60R 25/20 | (2013.01) |
| G07C 9/28 | (2020.01) |

(52) U.S. Cl.
CPC ............ *B60R 25/24* (2013.01); *B60R 25/007* (2013.01); *B60R 25/104* (2013.01); *B60R 25/2009* (2013.01); *F16H 61/22* (2013.01); *G07C 9/28* (2020.01); *B60R 2025/1013* (2013.01); *B60R 2325/20* (2013.01)

(58) Field of Classification Search
CPC ..... B60R 25/24; B60R 25/007; B60R 25/104; B60R 25/2009; F16H 61/22; G07C 9/00111

See application file for complete search history.

(56) References Cited

U.S. PATENT DOCUMENTS

| | | | |
|---|---|---|---|
| 5,944,631 A | 8/1999 | Schafer | |
| 6,594,565 B1 | 7/2003 | Schafer | |
| 7,274,980 B1 | 9/2007 | Schafer | |
| 9,132,805 B1* | 9/2015 | King | B60R 25/04 |
| 9,421,945 B1* | 8/2016 | Smathers | B60R 25/08 |
| 9,469,261 B1 | 10/2016 | Thomas | |
| 2008/0045381 A1* | 2/2008 | Vermeersch | B60R 25/066 |
| | | | 477/99 |
| 2012/0158244 A1* | 6/2012 | Talty | B60R 25/24 |
| | | | 701/36 |

(Continued)

*Primary Examiner* — Phung Nguyen
(74) *Attorney, Agent, or Firm* — Heisler & Associates

(57) ABSTRACT

A controller is integrated into a vehicle with the controller coupled to a fob detector and also coupled to a vehicle disabler. Examples of vehicle disablers include a brake transmission shift interlock (BTSI), a transmission shift interlock (TSI) and an air brake or electric parking brake of the vehicle. The fob detector can be provided along with the controller and separate from a mechanical key ignition of the vehicle, or can be a fob detector associated with a keyless ignition of the vehicle. A mobile fob is used as part of the system, carried on the person of an authorized driver of the vehicle. This fob can be provided separately from the vehicle, along with the controller, or can be a fob associated with a keyless entry of the vehicle. The controller causes the vehicle disabler to not be disengaged unless presence of the fob is detected by the fob detector.

18 Claims, 2 Drawing Sheets

(56) References Cited

U.S. PATENT DOCUMENTS

2014/0277973 A1* 9/2014 Nedorezov ............. B60R 25/00
                                                   701/53
2018/0029607 A1* 2/2018 Khalifeh ............... B60W 50/14
2018/0297555 A1* 10/2018 Simon ..................... B60R 25/02

* cited by examiner

SYSTEM AND METHOD FOR VEHICLE THEFT PREVENTION

CROSS-REFERENCE TO RELATED APPLICATIONS

This application claims benefit under Title 35, United States Code § 119(e) of U.S. Provisional Application No. 62/547,575 filed on Aug. 18, 2017.

FIELD OF THE INVENTION

The following invention relates to vehicle subsystems which control who may operate a vehicle and which prevent loss of the vehicle. More particularly, this invention is related to vehicle theft prevention systems, and particularly automobile and other road vehicle theft prevention systems, which use the brake transmission shift interlock (BTSI) element on the vehicle, or other vehicle disabler, to disable the vehicle when a fob carried by an authorized user is not present.

BACKGROUND OF THE INVENTION

Emergency vehicles such as police, fire, work truck and ambulances are particularly vulnerable to theft, as they are frequently left unattended with the engine running, due to the nature of their use. Closing the windows and locking the doors is a small deterrent to thieves, only requiring breaking a window to steal the vehicle and all its equipment.

The invention here described provides a fully automatic and passive way for these vehicles to be "locked down" or prevented from being driven when the authorized driver leaves the vehicle running but unattended. When the driver returns to the vehicle, the vehicle is automatically "unlocked," allowing the vehicle to be driven.

The driver does not have to activate the system or operate any controls. The only requirement is that he carry the vehicle's key fob on his/her person. For vehicles without an original equipment fob, an aftermarket fob can be used.
FMVSS and BTSI The U.S. Federal Motor Vehicle Safety Standard (FMVSS) requires vehicles under 10,000 lbs GVWR to have a Brake Transmission Shift Interlock (BTSI) which requires the driver to press the Service Brake in order to shift the transmission out of "Park" (when the key or ignition is in the "Run" position/state). This BTSI lock mechanism locks the transmission in Park, such that it cannot be shifted out, thus "locking down" the vehicle until the Service Brake is pressed. The BTSI can be manipulated or controlled for other purposes to lock the vehicle in Park and prevent driving the vehicle, even if the Service Brake is pressed.
Dodge Charger Secure Park—Background Art The police version of the DODGE CHARGER (a trademark brand of FCA US LLC) does not use a conventional key, but rather a wireless Radio Frequency (RF) key fob, and a stop/start button for turning the engine off/on. Getting in the vehicle and pressing the stop/start button will do nothing unless the vehicle senses the proximity of the fob. If the fob is present (and Service Brake pushed), pressing the stop/start button will start the vehicle. The vehicle has the ability to detect the proximity of the RF fob.

The police version of the DODGE CHARGER has a feature known by the trademark "SECURE PARK," in which the driver can push a steering wheel button with the engine running and transmission in Park. If the vehicle senses the presence of the fob, the vehicle will enter SECURE PARK mode, in which the BTSI is activated and the transmission cannot be shifted out of Park. The driver/officer can then leave the vehicle unattended and idling, and the locked BTSI will prevent the vehicle from being stolen or moved. The SECURE PARK system in the CHARGER requires the returning driver to again push the steering wheel button to release the BTSI. The vehicle must sense the presence of the key fob when the steering wheel button is pushed before it will exit SECURE PARK and release BTSI.

The CHARGER SECURE PARK system, while generally effective, is not automatic. In emergency situations (which are commonly encountered by emergency vehicles) emergent circumstances can often cause an operator to forget to push the button on the steering wheel, or make a conscious decision to use that time for addressing other threatening circumstances. The vehicle is thus left in a configuration vulnerable to theft. Furthermore, emergency personnel, although highly trained, benefit from having less (and not more) things to remember to do when handling emergency situations. While theft prevention is a high priority, it is often not the absolute highest priority in dangerous circumstances. A need exists for a fully automated and passive theft deterrent system and method which requires little or no training for emergency personnel, and provides theft prevention benefits.

SUMMARY OF THE INVENTION

The current invention involves the installation of an aftermarket control module in the vehicle, and requires the driver to wear or otherwise keep the fob with the driver, possibly in a duty belt. This system eliminates the need to push a button to lock or unlock BTSI, and eliminates the possibility of the driver forgetting to activate the system when leaving the vehicle running. The system automatically locks the BTSI (or other vehicle disabler system) whenever the vehicle is parked with the engine running, when the fob leaves the vehicle. This improves on the prior art by not requiring the driver to remember to push any button to activate or release BTSI (or other lock system). When the driver leaves the vehicle, the fob is no longer sensed as being present in the vehicle and the system locks the vehicle down. When the driver returns, the "body worn" fob will be automatically be detected, and the BTSI (or other system) will be deactivated, allowing the vehicle to be driven.

The invention is typically implemented with a control module, the RF fob, and a system (typically software running on the control module) for detecting the fob and activating or locking the BTSI. An "aftermarket" control module is provided to perform this function.

Most modern vehicles which use a wireless Radio Frequency (RF) fob have the ability to detect the proximity of the fob and this information is frequently available over the vehicles Controller Area Network ("CAN"), although reading this proprietary information can be a challenge. Deciphering and detecting these messages can sometimes be done through a process of "reverse engineering" the vehicles network messages. In such cases, this flow of existing information can be utilized by the control module, or other programmable element in the CAN network to both read fob proximity information, and also control the BTSI (i.e. engage or disengage the BTSI) and implement the system of this invention.
Scope This invention is useable on all vehicles which have some method of locking down or securing the vehicle. On chassis which have a BTSI, being able to manipulate the BTSI allows using it for this security feature. Vehicles without a BTSI frequently have air brakes, in which the air Park Brake can be activated and locked to prevent vehicle movement in an analogous manner. Another method of locking a vehicle in place could be an Electric Park Brake which could be activated and prevented from being released in an analogous manner to that in which the BTSI is controlled.

Securing the Weapons Rack and Trunk Release

Police and other government vehicles frequently have a weapons rack which secures one or more weapons such as a rifle. Usually there is a release button which must be pushed in order to release and remove the weapon for use. This button typically provides a timed period (e.g. 5-10 seconds during which a gun can be removed before it re-locks). Many emergency vehicles have a trunk or other storage area where they secure valuable or sensitive equipment. Such trunks/storage areas are typically also locked unless a release button is depressed.

The invention here described includes a disable output signal which can be used to disable the release button on the weapons rack, preventing unauthorized removal of weapons. This output can also be used to disable the vehicles trunk release button (or other compartment). This disable output goes active when the vehicle is placed in a lockdown mode, that is, when the driver and fob leaves the parked vehicle with engine running. The disable output can merely override signals from a weapons rack button or trunk/secure area release button.

Preferably, the disable output does not go immediately active when the fob leaves the vehicle, but rather has a configurable timer, such that the driver is given time to access the weapons rack or trunk after leaving the driver's seat. A key can also be used when the release buttons have been disabled, as a second alternative.

When the driver and fob returns to the vehicle, the disable output becomes non-active, which re-enables the weapons rack release button and the truck release. Thus, in this embodiment, the weapons rack and trunk are also secured when the driver leaves the vehicle.

Aftermarket Fob

All fobs have a unique ID which they communicate wirelessly to the receiving Electronic Control Unit ("ECU") in the vehicle (in the case of OEM (Original Equipment Manufacturer) fobs) or the control module (in the case of aftermarket fobs). On vehicles which do not come from the factory with an RF fob, one or more fobs can be provided which are "paired" to the aftermarket control module in the vehicle. The pairing allows the control module to identify authorized fobs. The RF fob can use any of several available wireless RF (or other transmission) technologies so its ID and presence can be detected by the control module. Active RFID would be one good choice that minimizes battery replacement frequency and provides appropriate range for the driver carrying the fob.

Fob Present Indicator Output

The control module provides an output signal which can be connected to an indicator such as an LED, to let the driver know the fob is detected as an authorized fob for this vehicle (or analogously that the fob is detected but not authorized or that no fob is detected), such as with different color LEDs. To detect fob presence, in one embodiment, the control module sends out an RF signal periodically (e.g. once every second). The fob will detect the RF signal "call" and return an RF signal "reply" that the control module detects. Presence of the fob is thus confirmed. If the fob does not detect the "call" or the control module does not detect the "reply" then the fob is considered by the system to be "absent" and (if the car is running and in Park) the lockdown mode is initiated. The control module keeps on periodically sending "calls" and the lockdown mode is suspended when the fob "reply" is again detected. If needed, such as for fault tolerance purposes and reliability, the system could be required to have two (or more) consecutive "non-reply" cycles before initiating lockdown. Alternatively, and with a programmed delay in lockdown, any detection of a "reply" from the fob while the timer is counting down to the "lockdown" command could reset the timer and return the system to the standard mode where the fob is being detected. As an option, fobs can be paired and authorized on multiple vehicles, allowing officers access to multiple vehicles without changing fobs. As one option, all officers of a police force or other law enforcement agency could carry a fob recognizable for all vehicles.

Controlling BTSI

The BTSI on many vehicles can be controlled via one or more of the vehicles networks, typically over a CAN network. On vehicles where this is not possible, a hard wired approach can be used, wherein the control module can be wired to the BTSI mechanism to override its normal operation and lock or unlock it.

Preventing Inadvertent Vehicle Lockdown

In the case of the Charger, and other chassis which use a fob, the OEM fob must be present to start the vehicle, and will thus always be detected on engine start. To prevent inadvertent vehicle lockdown when an aftermarket fob is being used on vehicles which do not come from the factory with an OEM fob, the system will not activate and lock the vehicle down if no fob was detected during engine start with a key. In this way, service personnel can operate the vehicle with the key, but without the fob and not have the system lock the vehicle down inadvertently.

As another option, the control module can provide an optional override input which can be connected to a hidden button, should the officer lose the fob while away from the vehicle, it's battery goes dead, or it is otherwise broken or disabled.

A typical CAN vehicle network includes numerous OEM Electronic Control Units (ECU's). These ECU's are embedded computers in the vehicle which control the engine, transmission, lights, HVAC, BTSI, and so on. In most vehicles, one of these ECU's has Radio Frequency ("RF") wireless communication capability, for communicating to a key fob and other wireless devices, such as the tire pressure monitoring system sensors in the wheels.

Connected to this network is the On Board Diagnostic II connector (OBDII) or other On Board Diagnostic (OBD) connector. This connector is used to gain access to the vehicle's networks. It is frequently possible to acquire fob proximity information over this connection, as well as control the vehicle's BTSI.

The RF fob could be of the OEM type, communicating to one of the vehicle's ECU's, or could be of the aftermarket type, communicating to the control module. In either case, the proximity (typically within 5 to 10 feet and potentially adjustable by the installer technician as to range) of the fob is determined, the fob authenticated, and used to "lock down" the vehicle when the fob is not detected, and the vehicle is parked and left running. The fob becomes a "body worn" device, staying with or on the driver's person.

The control module acquires fob proximity information either over the vehicle's network, or by its own RF communication circuits. In one embodiment, such proximity is established by the control module sending out an RF "call" signal. If the fob is within range it receives the "call" and sends a "reply" RF signal. When the control module detects the "reply" proximity is established. If no "reply" is detected the control module considers the fob to not be proximate and initiates "lockdown." Other RF protocols could be followed or other proximity sensors utilized. The module controls the vehicle's BTSI or other "lock down" system over the vehicle's CAN network, or by activating its discrete output signal. The active indicator LED is also shown in FIG. 1, as well as the optional override input.

A progression of steps followed in the operation of the system of this invention, and according to the method of this invention are described as follows. The lockdown system of this invention typically begins when the vehicle is stationary, the engine is running, and the transmission is in park. RF queries are sent periodically to the fob in the form of a "call." If the fob responds with an RF "reply," the system proceeds to evaluate if the fob is an authorized fob. If no fob is detected (no "reply" is received) or if the fob is not authorized, lockdown mode is initiated and the BTSI keeps the vehicle transmission in park. If the fob is detected and authorized, the system ensures that the BTSI is not locked, but rather is only engaged until the brake is depressed, as in normal operation of the BTSI.

As an option and further enhancement to the system of this invention, if the system is in "lockdown" mode with the BTSI commanded to remain in an orientation locking the transmission in park, and then brake depression is detected, rather than disengage the BTSI as would occur in normal operation without "lockdown" mode, the depression of the brake instead causes some form of an alarm to sound or be otherwise sent. This is because the fob is not detected and yet someone is depressing the brake, and thus is a potential vehicle thief attempting to shift the transmission out of park. The alarm could be in the form of sounding of the vehicle horn, flashing of lights, sending of emergency signals to a dispatcher over the vehicle radio, or some other alarm or combination of alarms. In one embodiment, horn honking occurs only for a limited time (e.g. 20 seconds) so that inadvertent triggering of the alarm will not cause exceptional nuisance or battery drain. Another option when detecting such a brake depression while in the lockdown mode would be to shut off the ignition and thus the engine of the vehicle.

OBJECTS OF THE INVENTION

Accordingly, a primary object of the present invention, according to at least one embodiment, is to prevent theft of a vehicle by utilizing an existing vehicle disabler system, such as a BTSI, on a vehicle and preventing disengagement of the vehicle disabler if a mobile fob carried by an authorized driver of the vehicle is not present adjacent to a fob detector on the vehicle.

Another object of the present invention is to provide a system for preventing theft of emergency vehicles.

Another object of the present invention is to provide a method for disabling a vehicle and keeping a vehicle disabled if presence of a fob carried by an authorized user of the vehicle is not present.

Another object of the present invention is to provide a vehicle disabler which keeps the vehicle disabled when presence of a fob carried by an authorized user is not present, using either a fob associated with a keyless ignition of the vehicle or a fob provided separate from a mechanical key ignition of the vehicle.

Another object of the present invention is to disable not only the vehicle, but also release of a weapon rack, trunk and/or other subsystems of the vehicle when presence of a fob carried by an authorized driver of the vehicle is not present.

Another object of the present invention is to provide a theft prevention system for an emergency vehicle which automatically engages when an authorized driver of the vehicle exits the vehicle, and automatically is disabled to allow vehicle operation when the authorized driver returns to the vehicle.

Another object of the present invention is to provide a vehicle disabler which can be overridden and allow vehicle operation by toggling an override switch, such as to allow maintenance personnel to operate the vehicle without an authorized driver fob being present, or in instances where the authorized driver fob becomes inoperable.

Other further objects of the present invention will become apparent from a careful reading of the included drawing figures, the claims and detailed description of the invention.

DESCRIPTION OF THE PREFERRED EMBODIMENT

Figure 1:
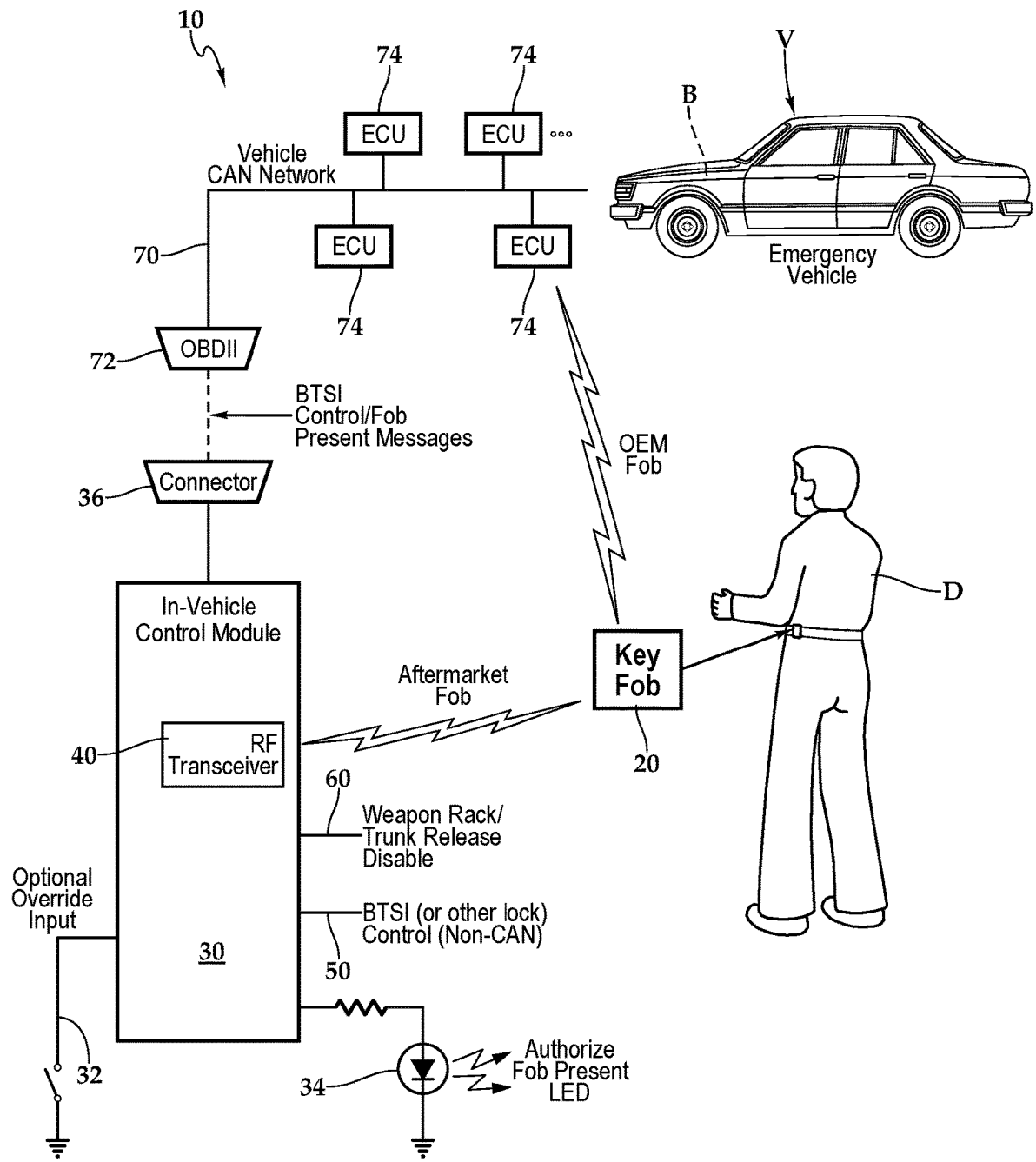
FIG. 1 is a schematic depicting the theft prevention system of this invention according to two different embodiments, including an embodiment where an OEM fob and fob detector associated with a keyless ignition system of the vehicle are utilized and a second embodiment where an aftermarket fob and fob detector are utilized.
Figure 2:
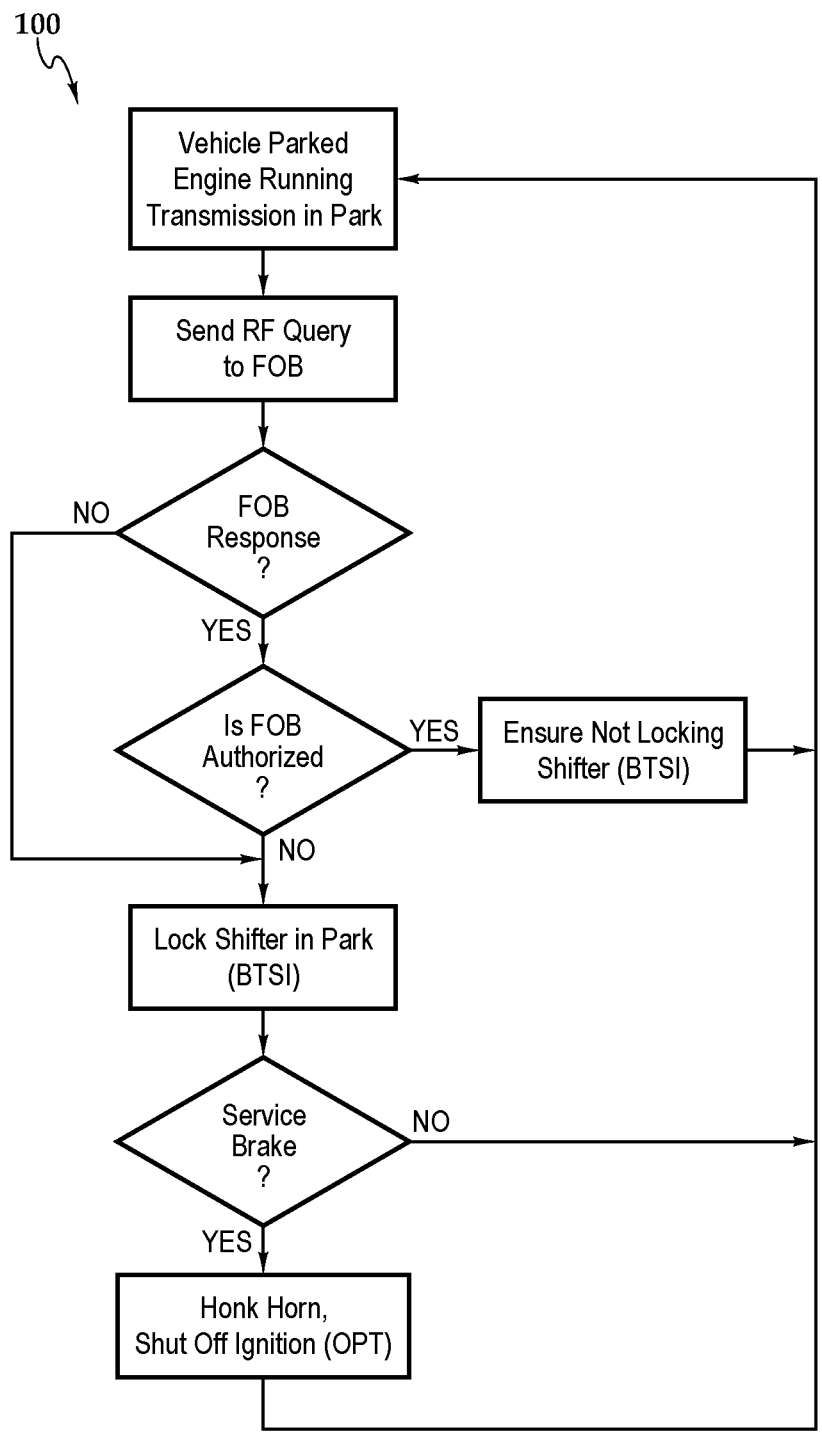
FIG. 2 is a flow chart illustrating operation of the system and method of this invention according to at least one embodiment disclosed herein.

Referring to the drawings, wherein like reference numerals represent like parts throughout the various drawing figures, reference numeral 10 is directed to a theft prevention system (FIG. 1) which can be integrated into various different subsystems of a vehicle V, and especially an emergency vehicle V, to assist in prevention of theft thereof or other unauthorized operation thereof. The system 10 includes two main variations both illustrated in FIG. 1. In a first embodiment, the vehicle has a keyless ignition system including a fob detector and a fob 20, and with the ignition requiring presence of the fob 20 adjacent to the fob detector for ignition and vehicle V operation. In a second embodiment, the ignition system is a mechanical key ignition system and a fob 20 and fob detector 40 are provided separate from the ignition system of the vehicle V to operate the system 10 of this invention. Other subsystems of the vehicle V can also optionally be disabled or otherwise controlled to both further deter theft, and to otherwise provide beneficial enhanced safety and optimal utilization of subsystems of the vehicle V.

In essence, and with particular reference to FIG. 1, basic details of the system of this invention are described, according to these two exemplary embodiments. The system 10 includes a fob 20 which can be an OEM fob associated with a keyless ignition of the vehicle V, or can be an aftermarket fob 20 provided as part of the system 10 of this invention, integrated into the vehicle V (either in originally configuring the vehicle V, or by retrofitting onto the vehicle V). A control module 30 provides a preferred form of controller integrated into the vehicle V as part of the system 10. This control module 30 includes an RF transceiver 40 (or other fob detector) as part of the control module 30, with the RF transceiver 40 configured to detect the aftermarket fob 20. If the fob 20 is an OEM fob 20, the control module 30 typically does not include the RF transceiver 40, but rather accesses a fob detector (such as an RF transceiver) associated with the keyless ignition of the vehicle V, such as by communicating with the controller area network (CAN) 70 of the vehicle V, and various electronic control units (ECUs) on the CAN 70, such as an ECU 74 configured as the fob detector of a keyless ignition system.

The control module 30 also connects to a brake transmission shift interlock (BTSI) B of the vehicle V (or other vehicle disabler), either through a BTSI B lock control line 50 leading from the control module 30 to the BTSI B, or through the CAN 70, to access the BTSI which is also typically coupled to the CAN through a body control module (BCM) which functions as an ECU. The controller module 30 is also coupled to an auxiliary release disabler 60, either through the CAN 70 or otherwise through a separate control signal line, for control of and disabling of auxiliary elements of the vehicle, such as a weapon rack release or a trunk release.

More specifically, and with continuing reference to FIG. 1, details of the fob 20 are described, according to at least one embodiment of this invention. The fob 20 is a mobile device which in many ways replaces the function of a mechanical key, especially for vehicles which have a keyless ignition system. This mobile fob is typically carried by an authorized driver of the vehicle. For instance, this fob can be carried in a pocket of the authorized driver. As another option, the fob can be secured to or integrated into a utility belt of the authorized driver/operator of the vehicle.

The fob in a preferred embodiment utilizes radio frequency (RF) technology to communicate with a fob detector 40. In one embodiment, the fob detector 40 is an RF transceiver associated with the control module 30 provided by the system of this invention. In at least one embodiment, the fob detector 74 is alternatively part of the keyless ignition system of the vehicle V, and the control module 30 is coupled to the fob detector 74 through the CAN 70 of the vehicle V (but could alternatively be directly wired to or wirelessly communicate with the fob detector, either directly or through a separate interface).

In one embodiment, the fob detector 40 is an active RFID (radio frequency identification) type device and the fob 20 has appropriate circuitry so that when queried by a "call" from the fob detector 40, generates an appropriate "reply" RF signal from the fob 20 which can be detected by the fob detector 40 and represents that the fob 20 is present, sufficiently close to the fob detector that this reply from the fob 20 can be sensed by the fob detector 40. Furthermore, the fob 20 is typically encoded with a unique identifier, so that the fob detector 40 can recognize the identity of the fob 20 and verify that the fob 20 is the correct fob 20, before allowing vehicle ignition or other steps to be performed.

In some instances, RFID is not entirely "passive" with no power associated with the fob 20, but rather is "active" with power supplied to the fob 20 to boost the amplitude/intensity of the reply from the fob 20 and to allow detection of the fob 20 when it is a greater distance away from the fob detector 40. Both active and passive RFID type fobs 20 are contemplated according to this invention, with active RFID fobs 20 allowing identification of the fob 20 from a greater distance from the fob detector 40. In a preferred embodiment, a vehicle with an OEM active RFID fob is provided containing a battery. This allows detection by the detector 74 up to a distance of a meter or so, but when this fob leaves the vehicle, it can no longer be detected. This active RFID embodiment does not require aftermarket RF transceiver 40, but relies on the detector 74. In other embodiments the active RFID fob detector 74 (or 40) could be boosted to have a greater range, such as to include an area outside of the vehicle (such as adjacent to a trunk or a rear of a fire fighting vehicle).

An alternative to active RFID is passive RFID, where the fob has no battery, and no ability to transmit or communicate with the detector 40 (or 74) other than at very close range, an inch or two. This is typically called "near field" communication. Some vehicles use near field fobs (for instance Dodge RAM trucks) which plug into an "ignition switch" similar to a metal key. There is a coil "antenna" around the switch which "reads" the near field fob, which is still typically referred to as "RF." These ignition switches typically lock the fob in place so it can't be removed until the engine is shut off. Pretty much all "smart" metal keys of the last ten years have an embedded chip and use this same near field technology. The technology of this invention can be implemented with near field RFID or longer range (typically active RFID) RF transceivers.

Vehicles not having an active RFID system or other battery powered RF fob, such as those with mechanical keys, or passive near field RFID, will typically be outfitted with the fob detector 40 and aftermarket key fob 20 to provide the necessary "fob leaving the vehicle" detection.

Even with such an active RFID fob 20, this fob 20 could still be tuned in one embodiment of this invention, such as with an adjustable sensitivity input, so that a user can optimize the sensitivity of the system 10, by increasing the amplitude/intensity of the reply from the fob 20 or adjusting the receiving sensitivity of the fob detector 40 to match desired range for the fob 20 to be detected. For instance, if the vehicle is a firetruck and it is desirable that the equipment at a rear end of the firetruck be disabled and locked, unless presence of the fob 20 is detected, due to the greater distance involved, sensitivity of the system 10, and amplitude/intensity of the reply from the fob 20 could be increased to ensure proper operation in such circumstances.

Furthermore, if desired, the fob could have a "boost" button thereon which could be depressed by a user to boost an amplitude/intensity of the reply signal from the fob 20 when an authorized user having the fob is a relatively far distance from the vehicle V, but desires to have the fob detector 40 detect presence of the fob 20, so that theft prevention disabling subsystems are disengaged, to allow vehicle subsystems to be accessed. As an example, a user of a police emergency vehicle with a fob 20 having a relatively short range in typical use, could cause the fob 20 to emit a stronger reply signal to be detected by the fob detector 40 when the authorized individual is at a rear of the vehicle near the trunk of the vehicle V, by pushing the boost button on the fob 20. Such a boost could function by reducing resistance in an electric circuit including an antenna, so that the current through the antenna is boosted for the period that the button is depressed.

While the fob 20 described above is considered to use RF technology, and particularly RFID technology, other RF technology could alternatively be utilized, or frequencies other than radio frequency could be utilized, but still with electro-magnetic waves interacting between the fob 20 and the fob detector 40. In other embodiments, other transmission technology including sound waves or other signaling technologies of a wireless nature could be utilized between the fob 20 and the fob detector 40 in variations of this invention.

The control module 30 provides a preferred form of controller for implementing the system 10 of this invention.

In a typical embodiment, such as that disclosed in FIG. 1, the control module 30 is connected to a controller area network (CAN) 70 of the vehicle V. Typically, the CAN 70 includes an on-board diagnostic port 72 which allows for separate devices to be plugged into the CAN 70 of the vehicle V. The control module 30 includes a connector 36 thereon which attaches to the onboard diagnostic port 72 to allow for the control module 30 or other controller to interface with the CAN 70. As an alternative, the control module 30 could be plugged into other locations on the CAN bus 70, or wired (or wirelessly) connected to appropriate associated elements and subsystems of the vehicle V to implement the system 10 of this invention, such as being coupled to a fob detector associated with a keyless ignition system of the vehicle V, and/or coupling to the brake transmission shift interlock (BTSI) B of the vehicle V.

The control module 30 can include an onboard power source or can draw power from the CAN 70 to which it is coupled through the connector 36, or other sources of vehicle power. If the control module 30 is to be used with an aftermarket fob 20, the control module 30 typically includes the RF transceiver 40 or other fob detector thereon. Alternatively, the control module 30 could access the RF transceiver or other fob detector of a keyless ignition system through the CAN 70, or through a separate wired or wireless interface with the RF transceiver 40 or other OEM fob detector.

The control module 30 includes programming thereon to cause the control module 30 to implement the system of this invention according to desired parameters. This programming within the control module could be "firmware" integrated into electronics or otherwise built into the control module 30, so the control module 30 is effectively pre-programmed and not adjustable (or only adjustable within certain limited parameters). As an alternative, the control module 30 can be programmable, such as by including one or more programmable logic devices thereon which can be appropriately programmed either before or after coupling of the control module 30 to the CAN 70, or otherwise integrated into the vehicle V.

The control module optionally but preferably has a variety of subsystems associated therewith to implement the system 10 of this invention according to various different embodiments and permutations thereof. One such subsystem is an override switch 32 associated with the control module 30. This override switch 32 could be a manually toggleable switch between an operating position and a disabled position. As an alternative, this override switch 32 could be wirelessly accessed through some remote control device, to allow for disabling of the control module 30. Such an override switch 32 for the control module 30 can cause the control module 30 to be disabled when desired. When the control module 30 is disabled, various systems of the vehicle V continue to operate in the manner for which they are designed, and without the theft prevention system 10 of this invention being operable.

In the case of an aftermarket fob 20 ad RF transceiver 40, an override switch 32 can allow maintenance personnel or other authorized personnel, who do not have access to the fob 20, to operate the vehicle V and subsystems of the vehicle V, without being blocked by operation of the system 10 of this invention. Such an override switch 32, if a manually toggleable switch, would typically be hidden so that it would not be easily findable by a thief or other unauthorized personnel. Options could be provided for placement of such an override switch 32 in a variety of different locations to further thwart unauthorized utilization of the override switch 32 to defeat the system 10 of this invention, for theft or improper use of the vehicle V. The override switch 32 is sensed by the in-vehicle control module 30 which merely disables its normal operation. In the event that the fob 20 is damages or the battery goes dead while it is outside of the vehicle and the system is active, the user can deactivate the BTSI lock down by shutting off the vehicle and restarting it. Active RFID fobs are designed to also function in close proximity near field mode by using them to push the vehicle's stop/start button, establishing near field battery-less operation.

Other optional subsystems on the control module 30 include a BTSI lock 50 separate from the CAN 70. Some vehicles V may have a CAN 70 which is not coupled to the BTSI B. In which case, the BTSI lock control line 50 can be routed to the BTSI B, so that the control module 30 can appropriately disable the BTSI B and keep the vehicle from shifting out of park, such as when presence of the fob 20 is not detected by the fob detector 40.

This control line 50 can furthermore be utilized on vehicles which do not have a BTSI B associated therewith, or if vehicle disabling subsystems other than a BTSI B, or in addition to the BTSI B, are desired to also be utilized by the control module 30 to disable the vehicle most effectively, such as when presence of the fob 20 is not detected by the fob detector 40. Such alternative vehicle disabler subsystems can include transmission shift inhibitor (TSI) systems which are not related to the service brake, but prevent shifting of the transmission of the vehicle, air brakes of the vehicle, and parking brakes of the vehicle, either electric parking brakes or otherwise. Such a control line 50 can provide the same benefit for the system 10 of this invention as when the control module 30 controls the BTSI B, such as through the CAN 70, by causing the vehicle disabler to remain in a mode disabling the vehicle V, and be prevented from disengagement when the control module 30 or other controller fails to detect the presence of the fob 20 proximate to the fob detector 40.

The control module 30 can be coupled to a horn of the vehicle V or other alarm system of the vehicle V with an audible alarm signal, which can, through the controller, cause the horn to sound when a service brake of the vehicle V is depressed, but the fob 20 is not detected by the fob detector 40. Such a subsystem would have a high likelihood of signaling to nearby personnel that a thief or other unauthorized individual is about to steal the vehicle V. The service brake is being depressed, but the fob 20 is not in proximity to the fob detector 40. By sounding the horn, adjacent authorized personnel can be alerted to this potential theft to take appropriate action. In addition to or as an alternative to sounding the horn, communication systems associated with the vehicle V (e.g. flashing lights or radio calls) could alert other authorized personnel that a vehicle is about to be potentially stolen or used in an unauthorized fashion.

The control module 30, in one embodiment, includes LED lights 34 (or other lights) on a housing thereof which can be viewed by maintenance personnel and/or authorized users of the system 10. In one embodiment, at least one LED light 34 is thereon which is illuminated when the fob 20 is detected by the fob detector 40 as being present. Such a light is useful in detecting whether the system 10 is operating appropriately. A second light could be provided which indicates that a fob 20 is detected, but that the fob 20 that is detected does not have the correct "ID" for the vehicle V. Such lights could assist in fleet operators configuring a fleet of vehicles to be easily programmed or otherwise modified and/or set up to work with the correct authorized driver's and other users of vehicles within the fleet.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for preventing theft of a vehicle having a brake transmission shift interlock (BTSI) thereon, the theft prevention system comprising in combination:
   a mobile fob, said fob carried by an authorized driver of the vehicle;
   a fob detector on the vehicle;
   said fob detector configured to detect presence of said fob near said detector;
   a controller coupled to said fob detector and coupled to said brake transmission shift interlock (BTSI);
   said controller preventing BTSI disengagement when presence of said fob is not detected by said fob detector; and
   wherein said controller is coupled to a horn of the vehicle, the controller sounding the horn when a brake of the vehicle is depressed and said fob detector is not detecting presence of said fob adjacent to said fob detector.

2. The theft prevention system of claim 1 wherein said fob detector is part of a keyless ignition system of the vehicle.

3. The theft prevention system of claim 1 wherein said fob detector and said fob are separate from a mechanical key ignition system of the vehicle.

4. The theft prevention system of claim 3 wherein said controller is coupled to said BTSI through a controller area network (CAN) associated with the vehicle.

5. The theft prevention system of claim 4 wherein said controller is coupled to said CAN through a connector interfacing with said CAN.

6. The theft prevention system of claim 5 wherein said controller includes at least one indicator light on a housing thereof, indicative of fob presence adjacent to said fob detector.

7. The theft prevention system of claim 3 wherein said controller is coupled to said BTSI separate from a controller area network (CAN) of the vehicle.

8. The theft prevention system of claim 1 wherein said controller is coupled to a weapon rack release, said controller preventing weapon rack release operation when presence of said fob is not detected by said fob detector.

9. The theft prevention system of claim 1 wherein said controller is coupled to a trunk release of a trunk of the vehicle, said controller preventing trunk release operation when presence of said fob is not detected by said fob detector.

10. The system of claim 1 wherein said controller is coupled to an override switch, said override switch disabling said controller when said switch is manually toggled.

11. A system for controlling use of a vehicle, comprising in combination:
    a mobile fob, said fob carried by an authorized driver of the vehicle;
    a fob detector on the vehicle;
    said fob detector configured to detect presence of said fob near said detector;
    a controller coupled to said fob detector and coupled to a vehicle disabler taken from the group of disablers including one or more of: a brake transmission shift interlock (BTSI), a transmission shift inhibitor (TSI), an air brake system of the vehicle, and an electric parking brake system of the vehicle;
    said controller preventing vehicle disabler disengagement when presence of said fob is not detected by said fob detector; and
    wherein said controller is coupled to a horn of the vehicle, the controller sounding the horn when a brake of the vehicle is depressed and said fob detector is not detecting presence of said fob adjacent to said fob detector.

12. The system of claim 11 wherein said fob detector is part of a keyless ignition system of the vehicle.

13. The system of claim 11 wherein said fob detector and said fob are separate from a mechanical key ignition system of the vehicle.

14. The system of claim 11 wherein said controller is coupled to said vehicle disabler separate from a controller area network (CAN) of the vehicle.

15. A method for preventing theft of a vehicle, including the steps of:
    having an authorized driver of the vehicle carry a mobile fob;
    the vehicle including a fob detector configured to detect the presence of the mobile fob near the detector;
    the vehicle further including a controller coupled to said fob detector and coupled to a vehicle disabler taken from the group of disablers including one or more of: a brake transmission shift interlock (BTSI), a transmission shift interlock (TSI), an air brake system of the vehicle and an electric parking brake system of the vehicle;
    preventing vehicle disabler disengagement when presence of the fob is not detected by the fob detector; and
    including the further step of sounding a horn of the vehicle when the fob detector does not detect the presence of the fob and when a brake of the vehicle is depressed.

16. The method of claim 15 including the further step of coupling the controller to the fob detector provided as part of a keyless ignition of the vehicle for use in said preventing step.

17. The method of claim 15 including the further step of disabling a weapon rack release of the vehicle when the mobile fob is not detected by the fob detector.

18. The method of claim 15 including the further step of disabling a trunk release of the vehicle when the mobile fob is not detected by the fob detector.

* * * * *